United States Patent Office 3,454,798
Patented July 8, 1969

3,454,798
ELECTRICALLY INSULATING WALL
David Yerouchalmi, Issy-les-Moulineaux, France, assignor to Commissariat a l'Énergie Atomique, Paris, France
Filed Mar. 6, 1967, Ser. No. 620,953
Claims priority, application France, Mar. 22, 1966, 54,573
Int. Cl. H02k 45/00
U.S. Cl. 310—11                8 Claims

ABSTRACT OF THE DISCLOSURE

The insulating wall of a magnetohydrodynamic conversion duct comprises a metallic casing cooled by a circulation of water, a partition structure carried by said casing and bricks having in plan a substantially square configuration, said bricks being engaged in said partition structure in interfitting relation therewith and provided with projecting edges which cover the partition structure.

---

This invention relates to an electrically insulating wall of composite structure for MHD (magnetohydrodynamic) conversion ducts. Some MHD power generators which operate on the open-cycle principle comprise a duct of rectangular cross-section in which the combustion gases which are heated to 2700–3000° K. either by superoxidation or by addition of secondary air at high temperature are ionized by seeding with an alkali metal and thus acquire an eelctrical conductivity of the order of 10 to 40 mhos/meter. These seeded gases circulate at velocities of approximately 700–800 m./s. in an intense magnetic field (higher than 2 teslas) produced at right angles to two of the conversion duct walls which are located opposite to each other and which must provide electric insulation. Thus, said gases become the source of an electric current which is substantialy perpendicular to the direction of their displacement as well as to the direcion of the magnetic field, in accordance with Laplace's law. The current thus generated can be collected in an external load circuit, provided that the two remaining and opposite walls of the duct are electrically conductive and that the electrical contact between the seeded hot gases and the frontal face of the electrode does not result in any appreciable voltage drop.

The electrically insulating walls of the conversion duct must evidently not be the source of leakage currents either at the surface or at the center which would short-circuit the current generated in the ionized combustion gases and which would give rise to undue losses of energy. It is possible in principle to make use of metallic walls made up of an assembly of polygonal bricks (usually square) which are electrically insulated from each other by ceramic elements and cooled by circulation of an internal flow of air or water. This type of wall, in which the frontal face (namely the face which is in contact with the seeded gas) is maintained at a low temperature, is subject to two major disadvantages, and these arise from the fact that the seeding material is deposited in liquid form on the cooled frontal face. In the first place, the liquid seeding material is deposited on the insulating material which is usually formed by a porous calcium aluminate cement and migrates into this latter, thereby rendering this latter conductive in a very short time. In the second place, film of liquid seeding matrial is driven by the gases at high velocity over the metallic bricks and inevitably causes corrosion of the metal and its subsequent destruction, even in the case of a very thin film. Leakage currents occur within a fairly short time in the type of wall and result in prohibitive losses of energy.

The above-noted disadvantages evidently disappear if the frontal face of the electrically insulating wall is maintained at a temperature which is substantially higher than the dew point or temperature of liquefaction of the seeding alkali metal. However, it is in that case essential to prevent the constitutent ceramic materials from exceeding a conductivity of 1 to 5 mhos/meter. This value constitutes a limit which is set by the conditions of operation of MHD generators. In order to satisfy these conditions, it is necessary to ensure:

On the one hand that the electrically insulating ceramic material has a sufficiently high density to prevent any migration of seeding material in the form of vapor within the colder internal pores in which said seeding material would liquefy and thus render the ceramic material rapidly conductive. It is known to fabricate and sinter ceramic materials which are electrically insulating at high temperature (alumina, magnesia or zirconates) either by isostatic pressing, sintering under pressure, supercompression and sintering at high temperature or alternatively by fusion and casting in a sand mold. Such ceramic materials have densities in the vicinity of or even higher than 90 to 95% of theoretical and are impervious to the peneration of seeding material. However, they are sensitive to thermal shocks and can be employed only in the form of small parts if they are to be subjected to high temperatures;

On the other hand that the temperature of the hot frontal face does not rise above a level at which the ceramic material no longer affords a sufficient degree of insulation. In point of fact, systematic measurements of electrical conductivities of a number of different ceramic materials have led to the conclusion that, apart from the monocrystals of magnesia which cannot readily be utilized, there was no ceramic material which afforded a sufficient degree of electrical insulation for MHD energy conversion above 1900–2000° K.

In order that the ceramic frontal faces should retain their electrical insulation properties at 1900°–2000° K. while gases circulate in the MHD conversion duct at temperatures of 2700 to 3000° K. and velocities of the order of 700 to 800 meters per second, it is evidently essential to cool the structure which serves as a backing for the ceramic elements (and the thickness of which will depend on the heat conductivity of said elements and on the thermal flux which has to be removed by these latter), cooling being usually effected by a stream of water having a temperature of the order of 350° K.

Controlled cooling of the backing structure against which the ceramic elements are placed is obtained by fixing these latter either by mechanical clamping, ceramic-to-metal brazing or both on a cooled copper casing.

If, by way of nonlimitative example, the ceramic material employed is of electrically insulating zirconate (either of calcium or strontium), calculation shows that, in the case of a thermal flux of 60 to 70 watts/cm.$^2$ (experimental duct), the thickness of the zirconates is approximately 10 millimeters. Thus, it is possible to construct ceramic walls by making use of sintered monolithic parts having this thickness. However, the thickness is reduced to 1–1.5 mm. when the flux is 400 to 500 watts/cm.$^2$ (industrial duct having a thermal power rating of 500 mw.). And it is apparent that, in order to ensure that parts fabricated of high-density ceramic material should have sufficient mechanical strength to permit a service life of several hundred hours, it would clearly not be feasible to contemplate thickness of the order of 1 to 1.5 millimeters.

The present invention is directed to the design concept of an insulating wall which meets practical requirements more effectively than those employed in the prior art and, above all, which satisfies the conditions mentioned in the foregoing, especially insofar as it affords high resistance to thermal shock and possesses a high heat-removal capacity, thereby making it possible to maintain a sufficiently low temperature at the frontal face.

To this end, the invention proposes an insulating wall which comprises on the one hand a casing formed of heat-conducting material which is mantained at low temperature and provided on one face with a partition structure forming recesses and, on the other hand, bricks fabricated of high-density electrically insulating ceramic material, the dimensions in plan of said bricks being of the same order in all directions, said bricks being adapted to engage within said recesses in interfitting relation therewith and being provided above the partition structure with juxtaposed cornices, the height of said cornices and the dimensions in plan of the bricks being sufficiently small to ensure that the temperature of the frontal face of the wall which is exposed to the action of the hot gases does not exceed a value at which the ceramic material still retains its electric insulation properties.

In a preferred form of execution of the invention, the partition structure is constituted by partition elements and cross-pieces which are separated by said partition elements and disposed at right angles thereto, said cross-pieces being anchored in the casing and having a cross-section of progressively increasing width towards the frontal face in order to retain the bricks.

The invention further consists in other ararngements which are preferably employed in conjunction with those previously referred to but which can also be employed separately. All of these arrangements will become more readily apparent from the following description of modes of execution of the invention which are given by way of example and not in any limiting sense. Reference is had to the accompanying drawings, in which.

Figure 2:
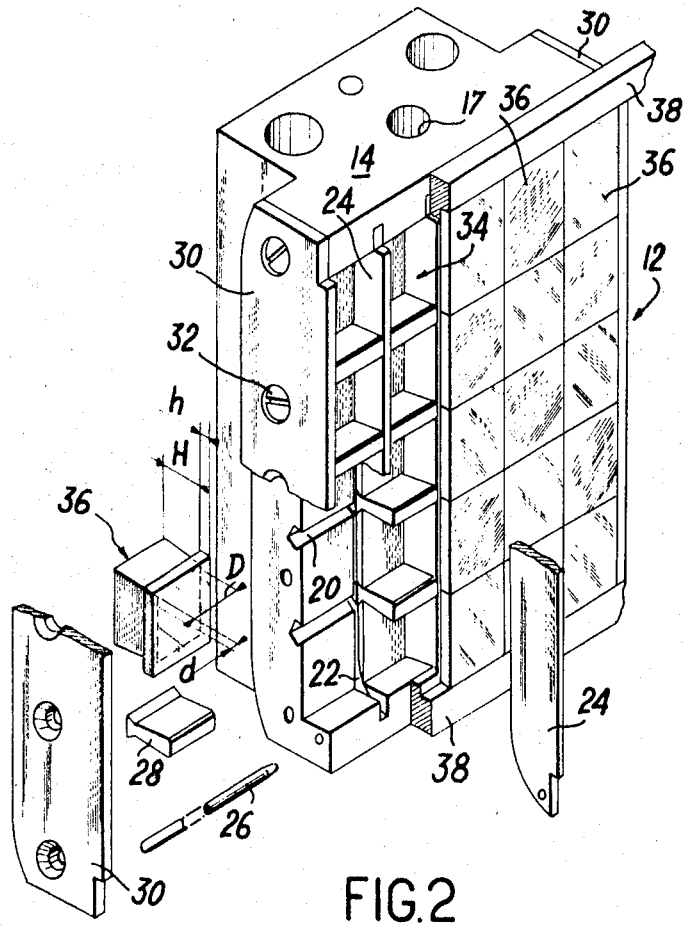
FIG. 2 is a partially exploded view in perspective of the insulating wall shown in FIG. 1, the spigot-joints which provide couplings with the cooling system having been omitted from the figure.
Figure 5:
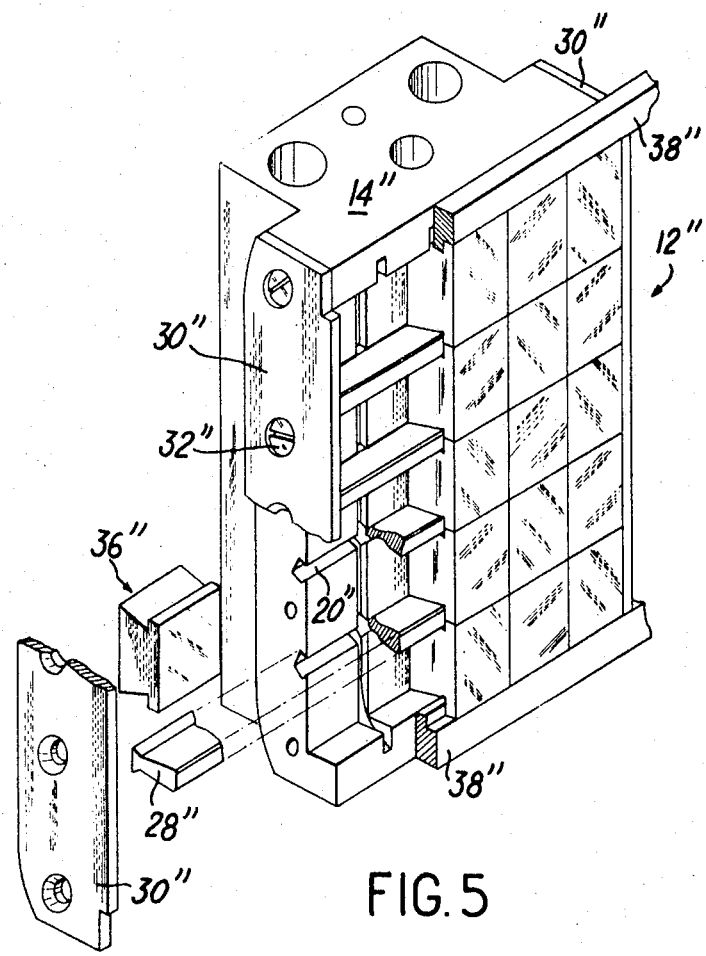

FIG. 5, which is similar to FIG. 2, shows another alternative form of the invention.

Figure 1:
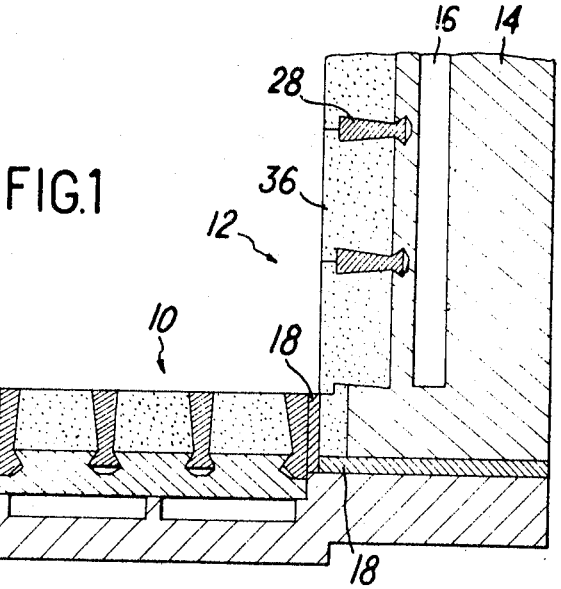
FIG. 1 is a partial view of a duct provided with a wall according to the invention and shown in cross-section along a plane at right angles to the direction of flow.

FIG. 1 shows a portion of a MHD conversion duct as shown in cross-section transversely to the direction of flow of the gases. Said duct comprises two opposite electrodes, of which only the electrode 10 is shown, and two insulating walls also in opposite relation, only one wall 12 being partially shown in the figure. The electrode is of the type described in the copending patent application filed on this day in the name of the present applicant in respect of "Composite electrode for MHD conversion duct." The insulating wall 12 which is shown in perspective in FIG. 2 comprises a casing 14 of conductive material (such as copper, for example) in which is formed a conduit 16 (shown in FIG. 1) through which cooling water is circulated and which is connected to passageways 17 (FIG. 2) for accommodating spigot-joints, not shown. Insulating strips 18 fabricated of ceramic material, for example, are interposed between the electrode 10 and the casing 14 of the wall 12.

There are cut in the frontal face of the casing 14 two series of grooves 20 and 22 for receiving a partition structure and located at right angles. The grooves 20 which are parallel to the direction of flow of gases have a dove-tailed cross-section. On the contrary, the grooves 22, which are orthogonal to the grooves 20, have a rectangular cross-section. Partition elements 24 having parallel faces (as shown in FIG. 2) are adapted to engage in the grooves 22 and are held in position therein by means of locking-pins 26. Small plates or cross-pieces 28 each having a base which corresponds in shape to that of the grooves 20 are engaged in and retained within these latter; said cross-pieces are separated from each other and secured against translational motion by means of the partition elements 24 and two flat clamping plates such as the plate 30 which are secured to the casing 14 by means of screws 32. Said clamping plates 30 also serve to retain the locking-pins 26. The cross-pieces 28 and partition elements 24 project to the same height H above the casing. That portion of each cross-piece 28 which projects from the groove has a cross-section of progressively increasing width so as to delimit with the partition elements blind-end recesses 34 which have a rectangular base and decrease in width from the casing 14.

In order to ensure good heat conduction between the casing 14 on the one hand, the partition elements 24 and the cross-pieces 28 on the other hand, a tin bond is formed between these members, as will be explained hereinafter.

There is thus formed a metallic partition structure which is cooled by the fluid as this latter circulates within the conduit 16 of the casing. Each recess 34 of said partition structure is adapted to accommodate a brick 36 of heat-insulating ceramic material such as calcium zirconate, for example, said brick being imprisoned by the cross-pieces which prevent it from being dislodged. The bricks are fabricated of ceramic material which has a high density and therefore low porosity, with the result that they cannot be impregnated with seeding material. Said bricks are usually prepared by sintering.

Each brick 36 is formed in one piece but can be regarded as composed of a base having a height H which is substantially equal to the depth of the recesses 34 and having a shape which is adapted to correspond to each recess, and also of a cap which projects laterally from the base and which has a thickness $h$. Each side of said cap has a length D so as to constitute a cornice which extends to a distance $d$ from the base; this distance is such that the space which is permitted to remain between the caps of two adjacent bricks is as small as possible and, in fact, sufficiently small to prevent the penetration of seeding material.

The lateral portions of the partition elements 24 are each provided with a shoulder which serves to bring said elements to the level of the edges of the casing 14, thereby permitting the insertion of two rules 38 of insulating ceramic material, a flange of each rule being adapted to engage beneath the bricks 36 which form part of the lateral rows of bricks. Said two rules 38 are locked in position by the electrodes (as shown in FIG. 1) once the conversion duct is assembled.

The dimensions H, $h$, D and $d$ of the bricks 36 of electrically insulating ceramic material and the depth of the metallic partition structure are calculated in order to ensure a thermal flux corresponding to the thermal power injected into the MHD conversion duct while maintaining the frontal faces of the ceramic elements at a temperature which does not exceed 1900–2000° K. Without any limitation being implied, the following values can be adopted in the case of a thermal flux of 40 to 50 watts/cm.$^2$ when the ceramic material is a zirconate: D=16 mm., H=8 to 9 mm., $h$=3 to 4 mm.

Thermal contact can be excellent between the high-density ceramic bricks 36 which are machined with high precision and the metallic cross-pieces 28 which are machined with the same degree of precision. Thermal conduction can be improved still further by depositing interstitial and lamellar coatings made up of a film of silver.

The use of high-density sintered ceramics is made structurally possible by removing the limitation which, in the case of a constant thickness of ceramic material over the entire frontal face, would be imposed by the maximum thickness in the direction of the thermal flux. Thus, if the lateral dimension D of the brick is sufficiently small (D can be considered as the side if the base is square, the diameter if it is a circle, the center-line in the case of a hexagon, and so forth), then there is a substantial lateral removal of heat even starting from the surface layers of the frontal face, and without imposing any objectionable limitation on the depth H which can be substantial.

The cornices having a width $d$ which form part of the bricks and are designed to cover the partition elements 24 and cross-pieces 28 of cooled metal have the essential function of insulating the cooled metallic casing 14 from the electric current generated by MHD in the seeded combustion gases. This value $d$ can be calculated so that the thermal flux is carried away towards the cooled metal of the partition structure while maintaining a temperature of 1900–2000° K. over the entire frontal face area. Since the caps are each integral with the ceramic bricks from which they project to a slight extent in relative dimensions, the structure is technologically sturdy.

The assembly of the wall is carried out in a very simple manner. In the casing which is already fitted with one of the clamping plates 30, there is inserted a row of cross-pieces 28 followed by the corresponding bricks. Both bricks 36 and cross-pieces 28 are then secured in position by inserting a first partition element 24. A second row of cross-pieces and bricks is then set in position and so on until the final introduction of the locking-pins 26 and fixing of the second clamping plate 30. Prior to the positioning of the cross-pieces, particles of tin are deposited inside the dovetailed grooves; these particles melt in situ after assembly of the metallic partition elements and cross-pieces by heating the entire partition structure to 400° C. Similarly, a varnish containing a suspension of silver is applied on the cross-pieces with a brush: the silver melts of its own accord during operation of the conversion duct and thus improves the contacts.

A noteworthy feature of the invention is the ease of disassembly of the structural unit which is constituted by the electrically insulating ceramic bricks 36, the metallic cross-pieces 28 and metallic partition elements 24 after an extended period of service and the ease with which new parts can be fitted in the place of the old, thereby permitting the reuse of the same casing 14.

Figure 4:
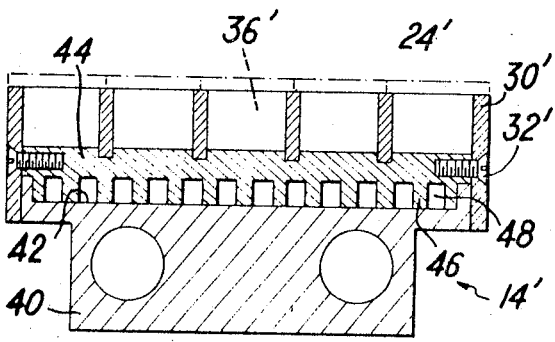
FIG. 4 is a view in cross-section taken along the line IV—IV of FIG. 3.
Figure 3:
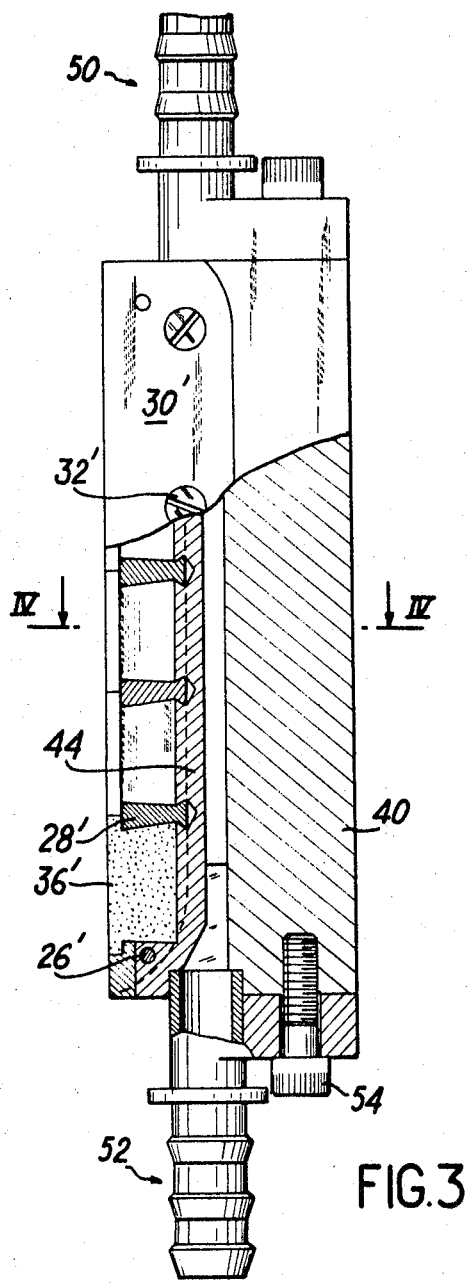
FIG. 3 is a view in elevation of a wall according to an alternative form of the invention, this view being a fragmentary cross-section taken along the midplane.

The alternative form of construction which is shown in FIGS. 3 and 4 differs in practice from those of FIGS. 1 and 2 only in respect of the casing structure which, in this embodiment, is made up of a number of inter-assembled parts. In FIGS. 3 and 4, those parts which have already been shown in FIGS. 1 and 2 are provided for the sake of clarity with the same reference numerals followed by the prime index.

The casing 14' is made up of two components, namely a solid trough 40 in which is machined a rectangular recess 42, and a frame 44 which supports partition elements 24', cross-pieces 28' and bricks 36'. Said two components are secured to each other, for example by brazing. The frame is provided with a series of projections 46 which, when the components are joined together, are applied against the bottom of the recess 42, thereby delimiting a series of parallel channels or passageways 48. There is thus achieved a very substantial increase in the contact surface between the frame 44 and the fluid (usually water) which circulates between the trough and the frame from the connecting nozzle 50 towards the connecting nozzle 52 (as shown in FIG. 3). The nozzles referred to are attached to the trough by means of screws 54, for example, and leak-tightness can be ensured by means of an additional brazed joint.

In the alternative form of construction which is shown in FIG. 5 (in which the parts already shown in the previous figures are provided for the sake of enhanced clarity with the same reference numerals followed by the second index), the partition structure is limited to the cross-pieces 28″. Each cross-piece 28″ has the same cross-section as in the previous embodiments but extends in this example along the full length of the wall 12″.

The bricks 36″ have a shape which is slightly different from that of the bricks 36 and 36′; in fact, the cap projects laterally from the base only on two sides in order to cover the cross-pieces 28″. Those sides of the bricks which, once the wall is assembled, bear against an adjacent brick, are evidently plane and perpendicular to the frontal face of the bricks.

The bricks of a same row are maintained firmly applied against each other by the clamping plates 30″ which also hold the cross-pieces 28″ in position.

What I claim is:

1. An electrically insulating wall for magnetohydrodynamic conversion ducts comprising a casing of heat conducting material, means for circulating a cooling fluid in said casing, a partition structure secured to said casing, a plurality of parallel walls for said partition structure transverse to said casing, pockets defined by said parallel walls decreasing progressively in size toward the front face of the wall, a plurality of ceramic blocks having their three dimensions of the same order of magnitude and fitting in said pockets, one face of said blocks being in contact with said casing, lateral cornices on the opposite face of said blocks, said cornices of adjacent ones of said blocks being substantially joined and said cornices having a thickness such that the temperature of the front face of the wall subject to the action of the hot gases does not exceed a value at which the ceramic material retains its electric insulation properties.

2. An electrically insulating wall in accordance with claim 1, the thermal contact between the ceramic blocks and said casing and said partition structure being improved by a silver coating applied on adjacent faces.

3. An electrically insulating wall in accordance with claim 1, the thermal contact between the partition structure and the cooled casing being improved by a layer of tin particles.

4. An electrically insulating wall for magnetohydrodynamic conversion ducts comprising a casing formed of heat-conducting material means for maintaining said casing at low temperature a partition structure on one face of said casing, bricks of high-density electrically insulating ceramic material mounted in said partition structure, the dimensions of said bricks being of the same order in three directions at right angles, said bricks extending over and above the partition structure in substantially juxtaposed cornices, said cornices being of such a height that the temperature of the frontal face of the wall exposed to the action of hot gases does not exceed a value at which the ceramic material still retains its electric insulation properties, said partition structure comprising cross-pieces anchored in the casing and of a cross-section of progressively increasing width towards the frontal face to retain the bricks.

5. An electrically insulating wall in accordance with claim 4, wherein the cross-pieces are anchored in the casing by means of a dovetailed sliding assembly.

6. An electrically insulating wall in accordance with claim 4, wherein the partition structure is constituted by partition elements and cross-pieces separated from each other by said partition elements and disposed at right angles thereto forming cells for said bricks.

7. An electrically insulating wall for magnetohydrodynamic conversion ducts, said wall comprising on the one hand a casing formed of heat conducting material, said casing being maintained at a low temperature and provided on one face with a partition structure made up of cross-pieces which are anchored in said casing and the thickness of which increases progressively towards the frontal face and, on the other hand, bricks of high-density electrically insulating ceramic material which are adapted to engage in said partition structure in interfitting relation therewith, said bricks having dimensions of the same order in three directions at right angles and being provided above said partition structure with substantially juxtaposed cornices.

8. An electrically insulating wall for magnetohydrodynamic conversion ducts, said wall comprising on the one hand a casing formed of heat-conducting material, said casing being maintained at a low temperature and provided on one face with a partition structure made up of partition elements and of cross-pieces which are anchored in said casing and which progressively increase in thickness towards the frontal face, said cross-pieces being separated from each other by the partition elements and disposed at right angles to said elements and, on the other hand, bricks of high-density, electrically insulating ceramic material which are engaged in interfitting relation with said partition structure, said bricks having in plan dimensions of the same order in all directions and being provided above said partition structure with substantially juxtaposed cornices.

References Cited

UNITED STATES PATENTS

| | | | |
|---|---|---|---|
| 3,271,597 | 9/1966 | Way | 310—11 |
| 3,280,349 | 10/1966 | Brenner et al. | 310—11 |

DAVID X. SLINEY, *Primary Examiner.*